(12) United States Patent
Cloud et al.

(10) Patent No.: US 11,867,951 B2
(45) Date of Patent: Jan. 9, 2024

(54) SYSTEM AND METHOD FOR OPTICAL COMMUNICATIONS USING CWDM FERRULE MATED TO A NON-CWDM FERRULE

(71) Applicant: US Conec, Ltd, Hickory, NC (US)

(72) Inventors: Mitchell Cloud, Hickory, NC (US); Darrell R. Childers, Hickory, NC (US); DJ Hastings, Maiden, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/635,314

(22) PCT Filed: Aug. 27, 2020

(86) PCT No.: PCT/US2020/048217
§ 371 (c)(1),
(2) Date: Feb. 14, 2022

(87) PCT Pub. No.: WO2021/041690
PCT Pub. Date: Mar. 4, 2021

(65) Prior Publication Data
US 2022/0276447 A1    Sep. 1, 2022

Related U.S. Application Data

(60) Provisional application No. 62/892,416, filed on Aug. 27, 2019, provisional application No. 62/892,413, filed on Aug. 27, 2019.

(51) Int. Cl.
*G02B 6/293* (2006.01)
*G02B 6/38* (2006.01)
(Continued)

(52) U.S. Cl.
CPC ......... *G02B 6/3829* (2013.01); *G02B 6/2938* (2013.01); *G02B 6/29361* (2013.01);
(Continued)

(58) Field of Classification Search
CPC .. G02B 6/3829; G02B 6/2938; G02B 6/4212; G02B 27/0961
See application file for complete search history.

(56) References Cited

U.S. PATENT DOCUMENTS

| 5,546,212 A | 8/1996 | Kunikane et al. |
| 9,229,167 B2 | 1/2016 | Chang et al. |

(Continued)

FOREIGN PATENT DOCUMENTS

| JP | 2003315604 A | 11/2003 |
| JP | 2005091996 A | 4/2005 |

(Continued)

OTHER PUBLICATIONS

International Search Report dated Dec. 9, 2020; 3 Pages.
(Continued)

*Primary Examiner* — Eric Wong
(74) *Attorney, Agent, or Firm* — Michael L Leetzow PLLC; Shubhrangshu Sengupta

(57) ABSTRACT

An assembly of two fiber optic ferrules allows for the mating of a CWDM fiber optic ferrule with a non-CWDM fiber optic ferrule. The CWDM fiber optic ferrule has optical fibers that carry optical beams with at least two different wavelengths, which the non-CWDM ferrule has optical fibers that carry only one wavelength. The CWDM fiber optic ferrule and the non-CWDM fiber optic ferrule have optical fibers that are inserted along parallel axes. The non-CWDM fiber optic ferrule has a lens pitch that matches the CWDM ferrule.

12 Claims, 12 Drawing Sheets

(51) Int. Cl.
*G02B 6/42* (2006.01)
*G02B 27/09* (2006.01)
*G02B 6/34* (2006.01)

(52) U.S. Cl.
CPC ......... *G02B 6/3807* (2013.01); *G02B 6/3845* (2013.01); *G02B 6/3853* (2013.01); *G02B 6/3882* (2013.01); *G02B 6/4206* (2013.01); *G02B 6/4215* (2013.01); *G02B 27/0961* (2013.01); *G02B 6/34* (2013.01); *G02B 6/3839* (2013.01); *G02B 6/3861* (2013.01); *G02B 6/3885* (2013.01)

(56) References Cited

U.S. PATENT DOCUMENTS

| | | | |
|---|---|---|---|
| 9,285,544 B2 | 3/2016 | Panotopoulos et al. | |
| 9,465,170 B1 | 10/2016 | Childers et al. | |
| 9,692,516 B2 | 6/2017 | Zhou et al. | |
| 9,798,087 B1 | 10/2017 | Mathai et al. | |
| 10,705,303 B2 | 7/2020 | Rosenberg et al. | |
| 10,816,735 B2* | 10/2020 | Cuno | G02B 6/3843 |
| 11,125,950 B2* | 9/2021 | Watanabe | G02B 6/12011 |
| 2010/0290739 A1* | 11/2010 | Kang | G02B 6/4212 385/52 |
| 2014/0308006 A1 | 10/2014 | Beausoleil et al. | |
| 2016/0282565 A1 | 9/2016 | Childers et al. | |
| 2016/0320569 A1 | 11/2016 | Fortusini et al. | |
| 2017/0052321 A1 | 2/2017 | Bushnell et al. | |
| 2017/0160491 A1 | 6/2017 | Zbinden | |
| 2018/0231727 A1* | 8/2018 | Kurtz | G02B 6/4292 |
| 2019/0052362 A1 | 2/2019 | Peterson et al. | |
| 2019/0052391 A1* | 2/2019 | Peterson | H04B 10/40 |
| 2020/0041727 A1 | 2/2020 | Yamamoto | |
| 2020/0192035 A1 | 6/2020 | Eigh et al. | |
| 2020/0363595 A1 | 11/2020 | Grann et al. | |

FOREIGN PATENT DOCUMENTS

| | | |
|---|---|---|
| JP | 2019090973 A | 6/2019 |
| JP | 2019139147 A | 8/2019 |
| WO | 2018221717 A1 | 12/2018 |

OTHER PUBLICATIONS

Written Opinion of ISR; dated Dec. 9, 2020; 5 pages.
European Patent Office Extended Search Report and Opinion for EPO Application No. 20857769.2 (National Stage of PCT/US2020/048217); dated Jun. 23, 2023; 7 pages.

* cited by examiner

SYSTEM AND METHOD FOR OPTICAL COMMUNICATIONS USING CWDM FERRULE MATED TO A NON-CWDM FERRULE

REFERENCE TO RELATED CASE

This application claims priority under 35 U.S.C. § 119 (e) to U.S. provisional application Nos. 62/892,416 and 62/892,413 both filed on Aug. 27, 2019, the contents of which are hereby incorporated by reference in their entirety.

BACKGROUND OF THE INVENTION

As the world becomes more dependent on on-line activities, mobile telephones, and virtual meetings and schools, the amount of data that is being transmitted and received is ever-increasing. However, the infrastructure that is currently in place is becoming more and more crowded with more and more optical fibers that carry that data and the connections that need to be made using those optical fibers. In one instance, there is a need for moving from data speeds of 10-40 Gbps to 100 Gbps (and beyond) in hyperscale datacenters. Various standards such as QSFP and OSFP are being proposed or have been implemented in support of such higher speed requirements with more optical fibers and fiber optic connectors per unit area. In addition, wavelength division multiplexing (WDM) techniques, combined with optimal encoding formats (NRZ, PAM4, etc.) are being exploited to yield yet higher speeds of data transfer. An example ferrule for handling optical beams at different wavelengths for four fibers is described in U.S. Pat. No. 9,692,516 ("the '516 patent").

For hyperscale data centers, a "leaf-spine" type architecture exists and is known in the art. In this architecture, servers handling high data speeds (terabits/second) form a "spine" of the data center. Additional servers that branch out from these spine servers form individual "leaves" of the "leaf-spine" architecture. The leaf servers handle lower data speeds. A high speed data link from one spine server to a group of leaf servers at lower speeds is typically serviced by MPO-style multi-fiber connectors. These MPO-style multi-fiber connectors then connect to an aggregate switch that is placed between "top-of-rack" switches ("ToR" switches) and the leaf server. The aggregate switch typically connects to the ToR switch via duplex LC connectors that have breakout fiber optic cables. The ToR switches further connect to and service individual racks of the servers. The ToR switch connects to the individual servers via copper cables, which presents a bottleneck in terms of speeds supported, costs, and space occupied.

There is a clear trend in the datacenter technology to advance speeds to 100 Gbps, and to 400 Gbps and beyond in the near future. The current setup in data centers was designed for 10-40 Gbps bandwidth, and the equipment needs a change in the type of fiber optic connectors as well as the way those fiber optic connectors are interconnected to handle higher data speeds. This requires a higher density of fiber optic connectors to be deployed within the same given space, as well as fiber optic ferrules that can handle coarse wavelength division multiplexing (CWDM) optical beams and be mateable with other types of lensed fiber optic ferrules that handle higher optical fiber counts. CWDM beams need to be split into individual optical beams for individual receiver channels, and combined into a composite CWDM in the other direction for transmission by a light source. The CWDM ferrules known in the art (e.g., in the '516 patent) only mate to a receptacle above a transceiver on a circuit board and are not utilized elsewhere in the optical link. Further, there are no techniques known in the current state of the art for intermateability of the CWDM ferrules to other types of non-CWDM ferrules. The pitch mismatch between the outputs of CWDM and non-CWDM ferrules is one of the challenges to address in mating of such ferrules.

Thus, an assembly of two fiber optic ferrules is presented to allow for the mating of CWDM and non-CWDM fiber optic ferrules. The non-CWDM fiber optic ferrule has optical fibers that carry different optical beams at different wavelengths. This configuration allows for the mating of the two different sides and allows for faster and higher throughputs of data.

SUMMARY OF THE INVENTION

The present invention is directed to an assembly of two fiber optic ferrules that includes a first fiber optic ferrule having at least one optical fiber for carrying at least two optical beams with different wavelengths, and a second fiber optic ferrule having a first optical fiber to carry one of the optical beams and a second optical fiber to carry the second optical beam, the second fiber optic ferrule having a front face to engage at least a portion of the first fiber optic ferrule and a plurality of external lenses, the plurality of external lenses being disposed behind the front face.

In some embodiments, the second ferrule is a non-CWDM ferrule and includes a filter block attached thereto.

In some embodiments, the first fiber optic ferrule has a plurality of reflectors on a forward facing surface.

In other embodiments, there is a plurality of transmissive lenses disposed within the recessed portion of the first fiber optic ferrule.

In some embodiments, the second fiber optic ferrule has a recessed portion at a front end, the plurality of external lenses disposed within the recessed portion and two forward facing surfaces to engage a filter block.

In yet another aspect, there is an assembly of two fiber optic ferrules that includes a first fiber optic ferrule having at least one optical fiber for carrying at least two optical beams with different wavelengths, a second fiber optic ferrule having a first optical fiber to carry one of the optical beams and a second optical fiber to carry the second optical beam, the second fiber optic ferrule having a front face to engage at least a portion of the first fiber optic ferrule and a plurality of external lenses, the plurality of external lenses being disposed behind the front face, and an interface plate disposed between and engaged to each of the first and second fiber optic ferrules.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
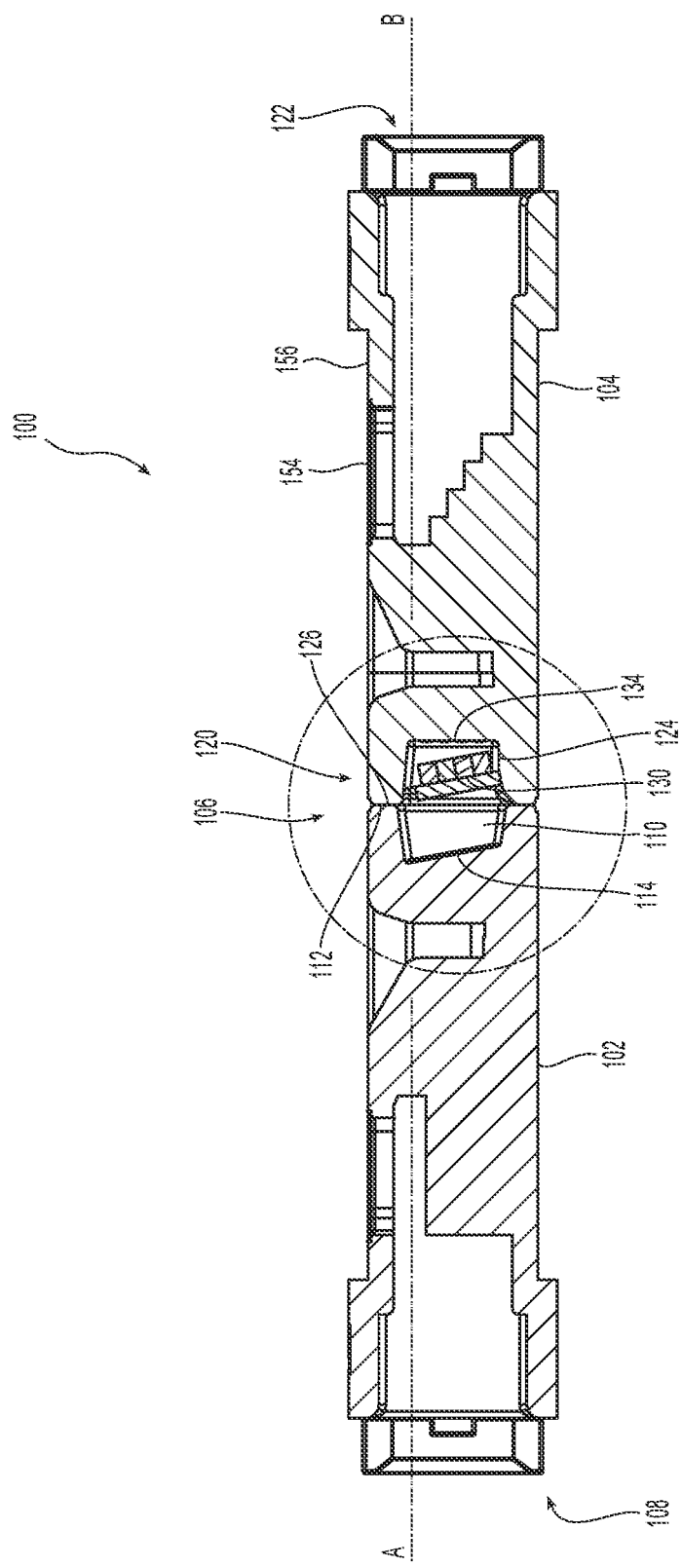
FIG. 1 is a side elevational view of a cross section of one embodiment of an assembly of two fiber optic ferrules according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Each of the fiber optic ferrules will therefore have a front and rear, and the two fronts or forward portions of the fiber optic ferrules would engage one another. Thus, in FIG. 1, the "front" of the fiber optic ferrule on the left side of the figures is that part of the fiber optic connector on the right side of FIG. 1 and "forward" is to the right. "Rearward" or "back" is that part of the fiber optic connector that is on the left side of the page and "rearward" and "backward" is toward the left. The front of the fiber optic ferrule on the right side of the FIG. 1 is facing the front of the fiber optic ferrule on the left and the rearward or back is to the right—as illustrated in FIG. 1.

Figure 2:
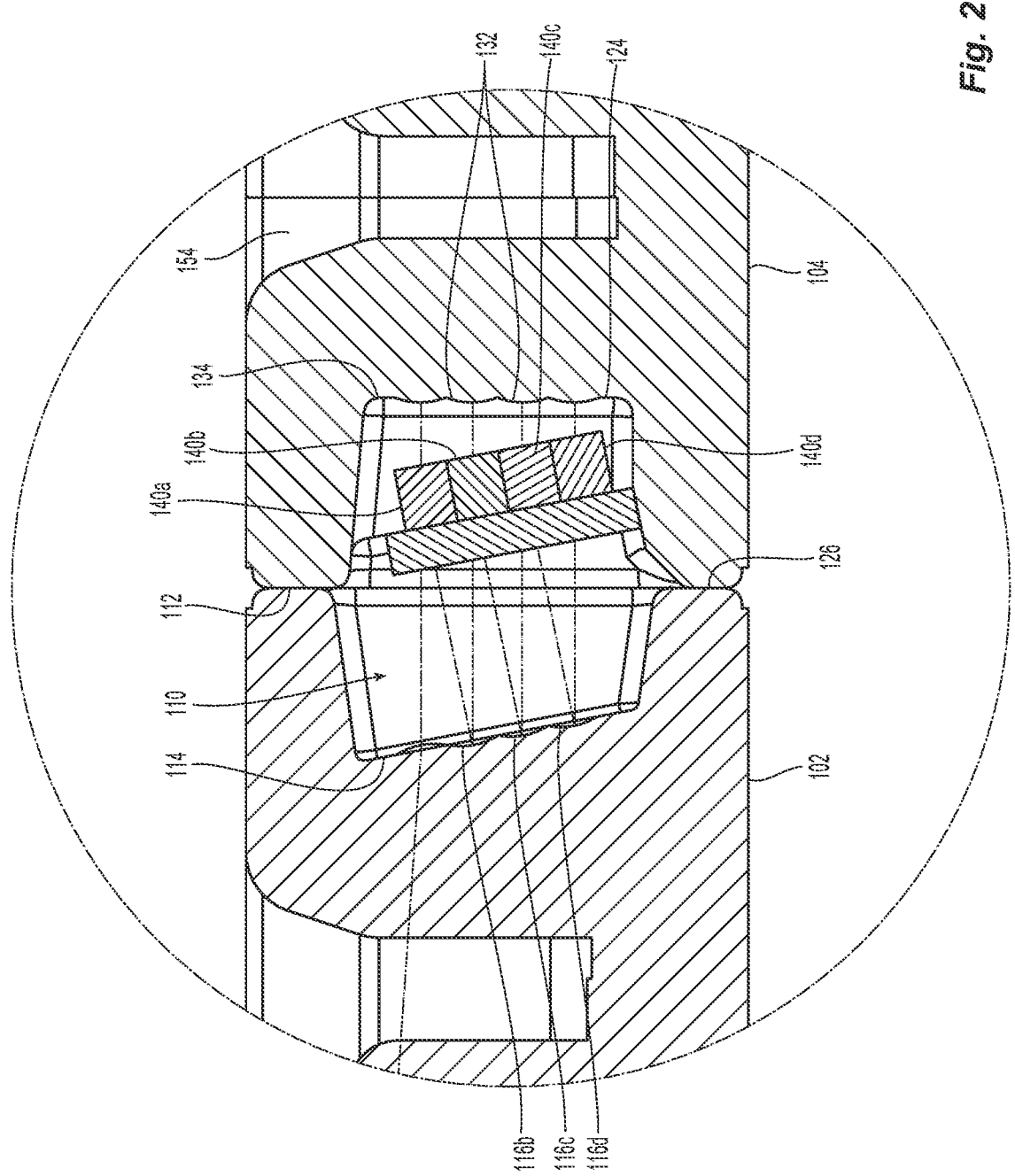
FIG. 2 is an enlarged view of a portion of the cross section of the assembly of two fiber optic ferrules in FIG. 1.
Figure 3:
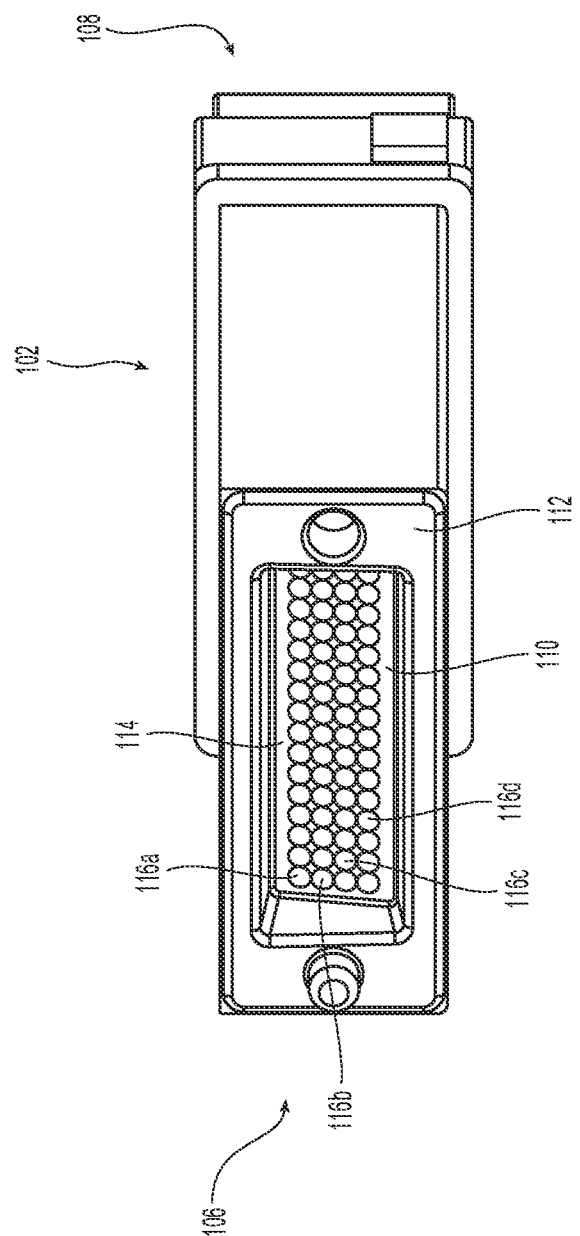
FIG. 3 is a perspective view from a front left side of a first fiber optic ferrule of the assembly in FIG. 1.
Figure 4:
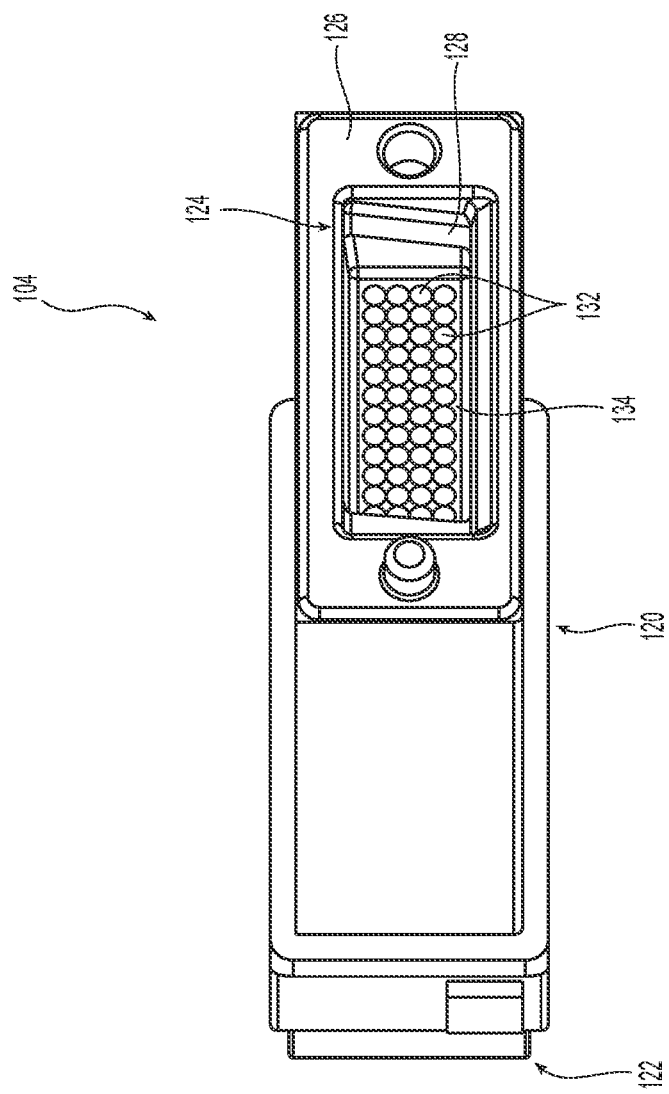
FIG. 4 is a perspective view of a portion of a second fiber optic ferrule from the front right side with the filter block removed.
Figure 5:
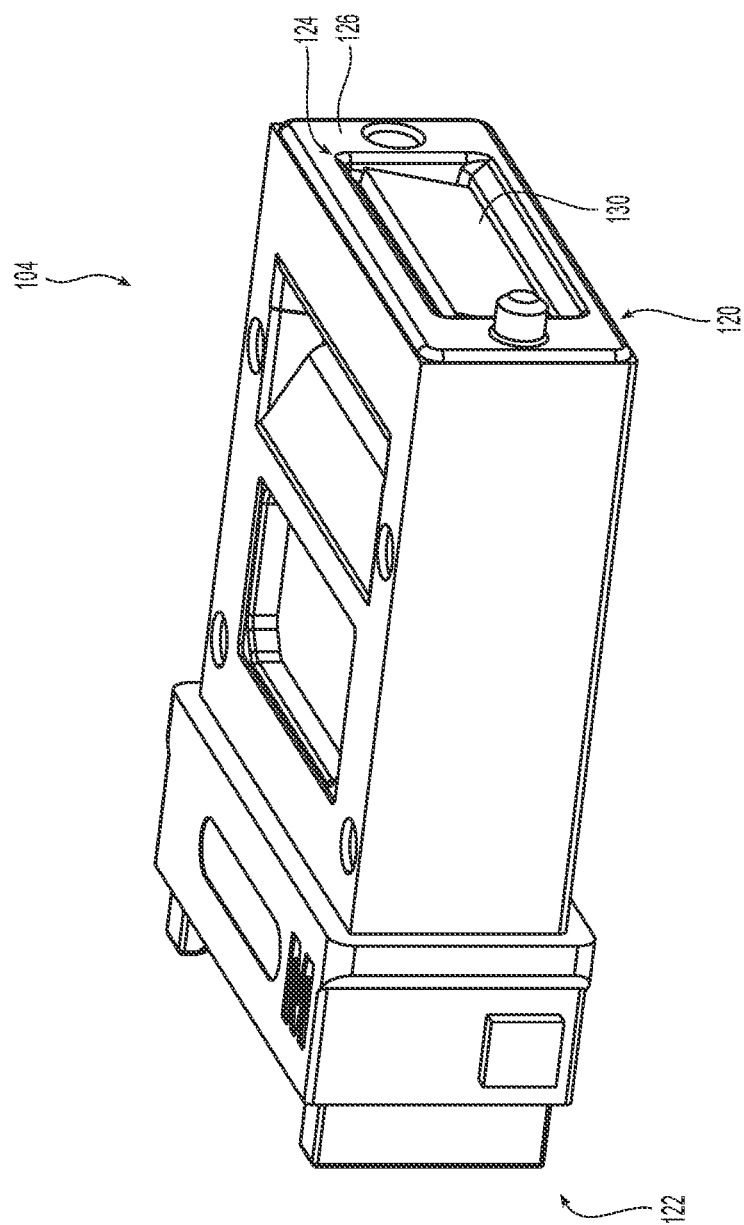
FIG. 5 is a perspective view from the right side of a transparent second fiber optic ferrule of FIG. 1.
Figure 6:
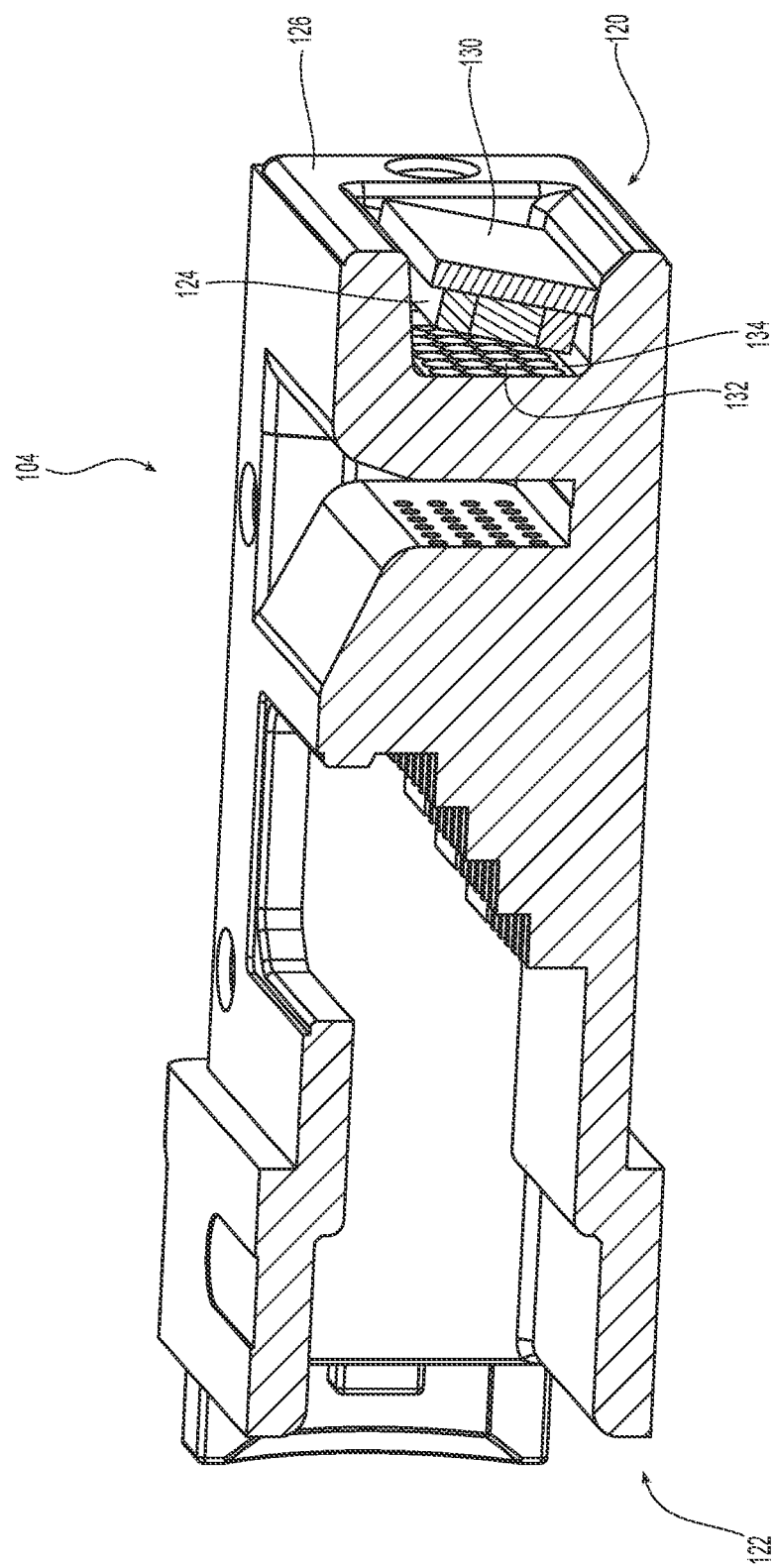
FIG. 6 is a perspective view from the right side of a cross section of the second fiber optic ferrule in FIG. 1.

Illustrated in FIGS. 1-6 is an assembly 100 of two fiber optic ferrules, a first fiber optic ferrule 102 and a second fiber optic ferrule 104. In FIGS. 1 and 2, the fiber optic ferrules are in a mated condition. First fiber optic ferrule 102 is a CWDM fiber optic ferrule and includes at least one optical fiber (not shown) that has an optical beam with at least two different wavelengths propagating therein. Such optical beams with different wavelengths may be generated by a light source (e.g., a laser) prior to entry into the first fiber optic ferrule 102 via the optical fibers. There may be more or fewer optical fibers in the fiber optic ferrules. Preferably there is only one row of optical fibers in the first fiber optic ferrule 102. In one example, the CWDM ferrule includes sixteen (16) fibers in a single row, each handling four different wavelengths ($\lambda_1$-$\lambda_4$) in a given band in the optical spectrum. For example, the possibilities include $\lambda_1$=990 nm, $\lambda_2$=1015 nm, $\lambda_3$=1040 nm, and $\lambda_4$=1065 nm, i.e., a difference ($\Delta\lambda$) between any two wavelengths is typically 25 nm. Typically, such CWDM ferrules are utilized for on-board optics in which the output beams at $\lambda_1$-$\lambda_4$ are received by a photodetector of an on-board transceiver. In the other direction (for transmission), these four optical beams are typically transmitted by an on-board light source (e.g., a VCSEL) and may enter individual optical fiber fibers of an optical fiber ribbon on the CWDM ferrule as a multiplexed optical beam or a composite beam. The output beams at $\lambda_1$-$\lambda_4$ wavelengths for the CWDM ferrule are at a pitch of 0.250 mm. That is, each wavelength at the output of the CWDM ferrule is spatially separated from the other by 0.250 mm. See FIGS. 1-3.

The first fiber optic ferrule 102 (CWDM) extends between a front end 106 and a rear end 108, and at the front end it has a recessed portion 110. The front end 106 also has a front face 112, which surrounds the recessed portion 110, but the front face 112 need not completely surround the recessed portion 110. Within that recessed portion 110 is an angled end face 114. The angled end face 114 has a plurality of rows 116, the first row 116a being a row of a plurality of transmissive lenses and the other rows being rows of reflectors 116b-116d, as explained below. See also FIG. 3. As noted above, there is preferably one row of optical fibers, with 16 fibers in the row, although there may be more or fewer rows (corresponding to optical fiber ribbons) and/or columns (corresponding to the number of optical fibers in each optical fiber ribbon) within the first fiber optic ferrule 102 (CWDM). The optical beams that are transmitted through the optical fibers pass through the first row 116a of transmissive lenses. The optical beams are further processed as discussed below with reference to the second fiber optic ferrule 104.

The second fiber optic ferrule 104 is a non-CWDM fiber optic ferrule in that the optical fibers carry optical beams that are of only one wavelength, rather than the multiple wavelengths carried in the optical fibers in the first fiber optic ferrule 102 (CWDM). The second fiber optic ferrule 104, a non-CWDM fiber optic ferrule, may be based on the PRIZM® MT ferrule provided by the Applicant. The second fiber optic ferrule 104 also extends between a front end 120 and a rear end 122, and at the front end it has a recessed portion 124. The front end 120 also has a front face 126, which surrounds the recessed portion 124, but the front face 126 need not completely surround the recessed portion 124. Preferably the front face 126 makes contact with the front face 112 of the first fiber optic ferrule 102 as illustrated in FIGS. 1 and 2. Within that recessed portion 124 are two angled surfaces 128 that provide a support and a stop for a filter block 130. See FIG. 4. The filter block 130 preferably fits within the recessed portion 124, but a portion may extend beyond the front face 126 and into the recessed portion 110 of the first fiber optic ferrule 104 (CWDM) during mating. The second fiber optic ferrule 104 also includes a number of rows of integrated lenses 132 on a forward facing surface 134 to help with the transmission of the optical beam to and from the optical fibers within the second fiber optic ferrule 104. In the example in FIG. 3, there are four rows of integrated lenses 132, which corresponds to the number of wavelengths in the optical beam carried by the optical fibers in the first fiber optic ferrule 102 (CWDM).

The filter block 130 is a wavelength specific filter that includes four filters 140(a-d)—one for each wavelength. The wavelengths rejected by one of the filters are reflected back into the first fiber optic ferrule 102 (CWDM) and encounter the next internal reflectors in one of the rows 116b-116d, in succession until the optical beam with the last wavelength passes through the filter block 130. By the principle of reversibility, the wavelengths follow the same path during transmission and reception. The recessed portions 110,124 could be deeper or shallower than that illustrated in the figures. However, the filter block 130 should not engage the first fiber optic ferrule 102 when they are mated to one another.

The first fiber optic ferrule 102 (CWDM) has an opening 150 in the rear end 108 to receive optical fibers therein along a longitudinal axis A. The second fiber optic ferrule 104 also receives optical fibers through an opening 152 in the rear end 122 along longitudinal axis B, which is parallel to the longitudinal axis A.

The second fiber optic ferrule 104 has optical fiber supporting structures 134 to receive the optical fibers that are inserted into the opening 152 in the rear end 122. The optical fiber supporting structures 134 may include micro holes, v-grooves, u-grooves, or have a different configuration. The second fiber optic ferrule 104 may also have epoxy windows 154 that open through a top side 156. Each of the plurality of external lenses 132 are optically aligned with a respective one of the optical fiber supporting structures 134.

Additionally, the pitch between the rows of optical fibers in the second fiber optic ferrule 104 is 0.250 mm, which matches the pitch of the separate output beams at $\lambda_1$-$\lambda_4$ wavelengths from the first fiber optic ferrule 102. The pitch of the columns of optical fibers in the second fiber optic ferrule 104 is 0.250 mm, which is the standard pitch for non-CWDM fiber optic ferrules. Further, each of the fiber optic ferrules 102, 104 are hermaphroditic as each has one projection and one opening to receive a projection.

A second embodiment of an assembly of two fiber optic ferrules according to the present invention is illustrated in FIGS. 7-14. In this embodiment of assembly 200, there is a first fiber optic ferrule 202 (CWDM) and a second fiber optic ferrule 204 (non-CWDM) and an interface plate 218 between the two fiber optic ferrules. The first fiber optic ferrule 202 (CWDM) extends between a front end 206 and a rear end 208, and at the front end it has a recessed portion 210. The front end 206 also has a front face 212, which surrounds the recessed portion 210, but the front face 212 need not completely surround the recessed portion 210. Within that recessed portion 210 is a forward facing surface 214. The forward facing surface 214 has a row 216 of transmissive lenses through which a composite optical beam passes. See also FIG. 9. As noted above, there is preferably one row of optical fibers, with 16 fibers in the row, although there may be more or fewer rows (corresponding to optical fiber ribbons) and/or columns (corresponding to the number of optical fibers in each optical fiber ribbon) within the first fiber optic ferrule 202 (CWDM). The optical beams that are transmitted through the optical fibers pass through the transmissive lenses in row 216. See FIG. 8. The optical beams are further processed as discussed below with reference to the second fiber optic ferrule 204 and the interface plate 218. It should be noted that the pitch between the optical fibers in both the first fiber optic ferrule 202 (CWDM) and the second fiber optic ferrule 204 are at the standard 0.250 mm.

Figure 7:
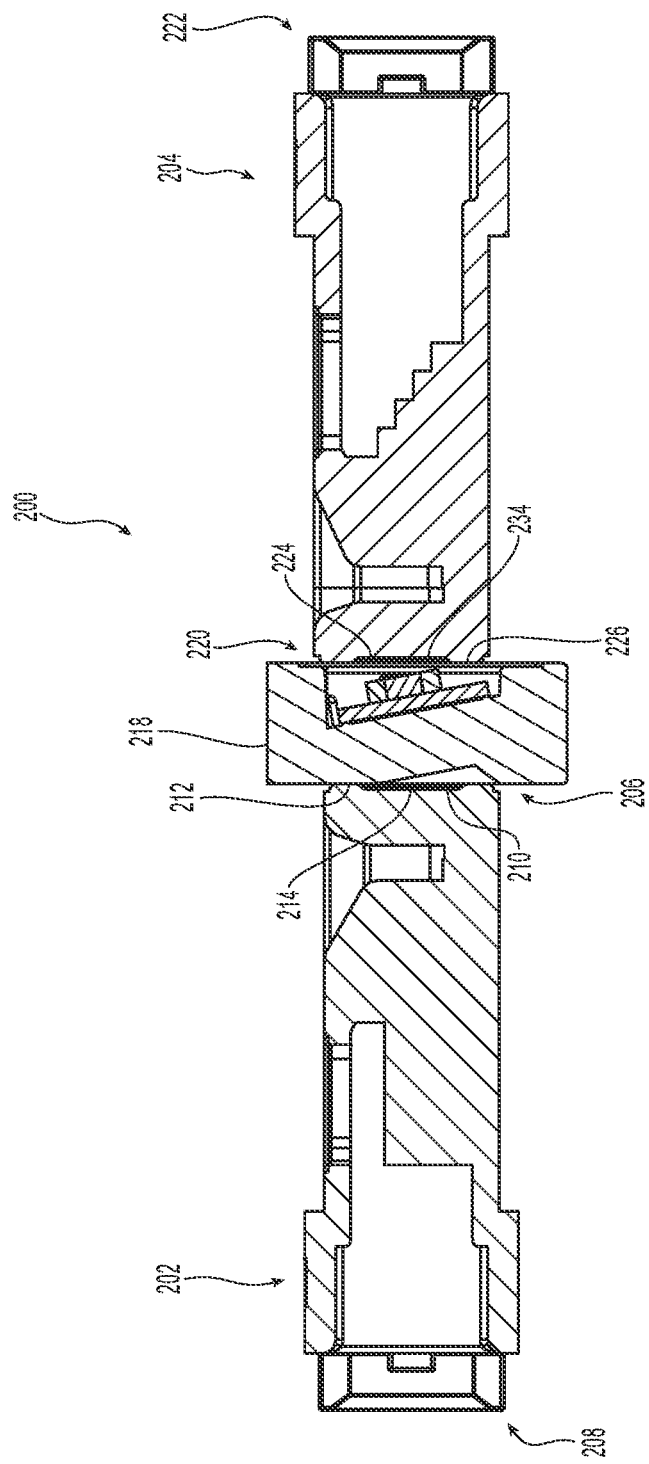
FIG. 7 is a cross section of a second embodiment of an assembly of two fiber optic ferrules mated with an interface plate according to the present invention
Figure 8:
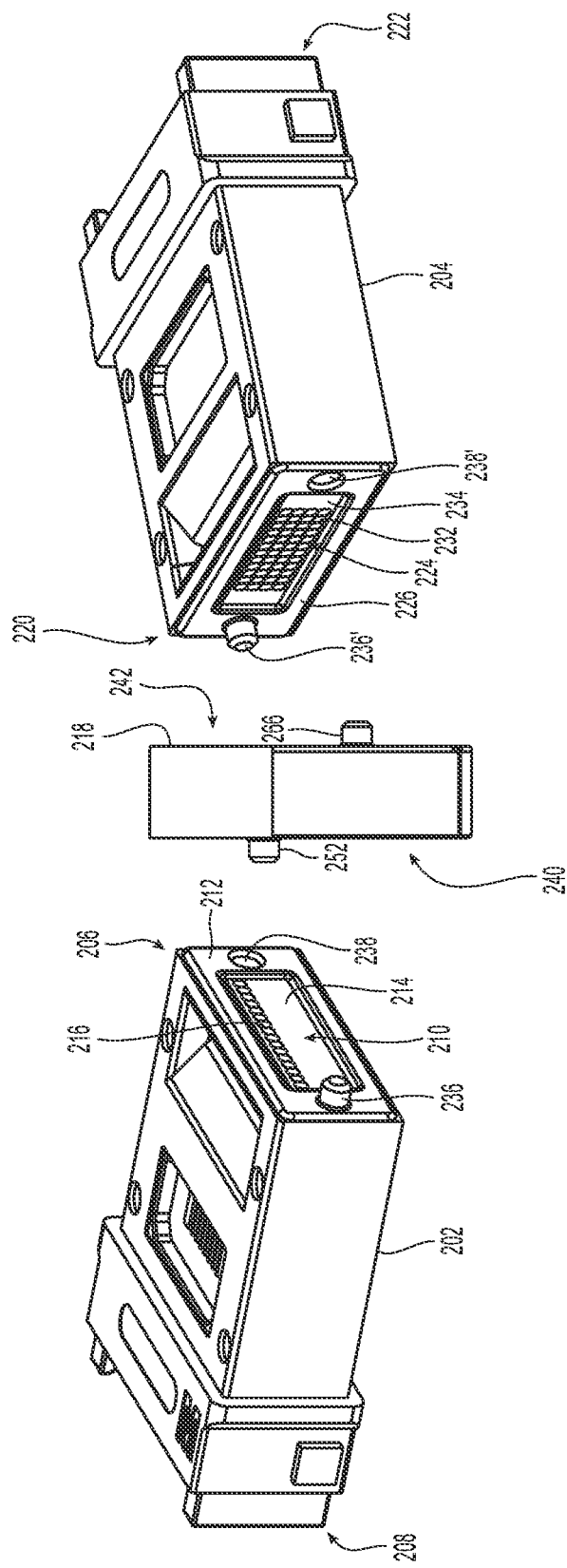
FIG. 8 is an exploded view of the assembly of fiber optic ferrules and interface plate of FIG. 7.
Figure 9:
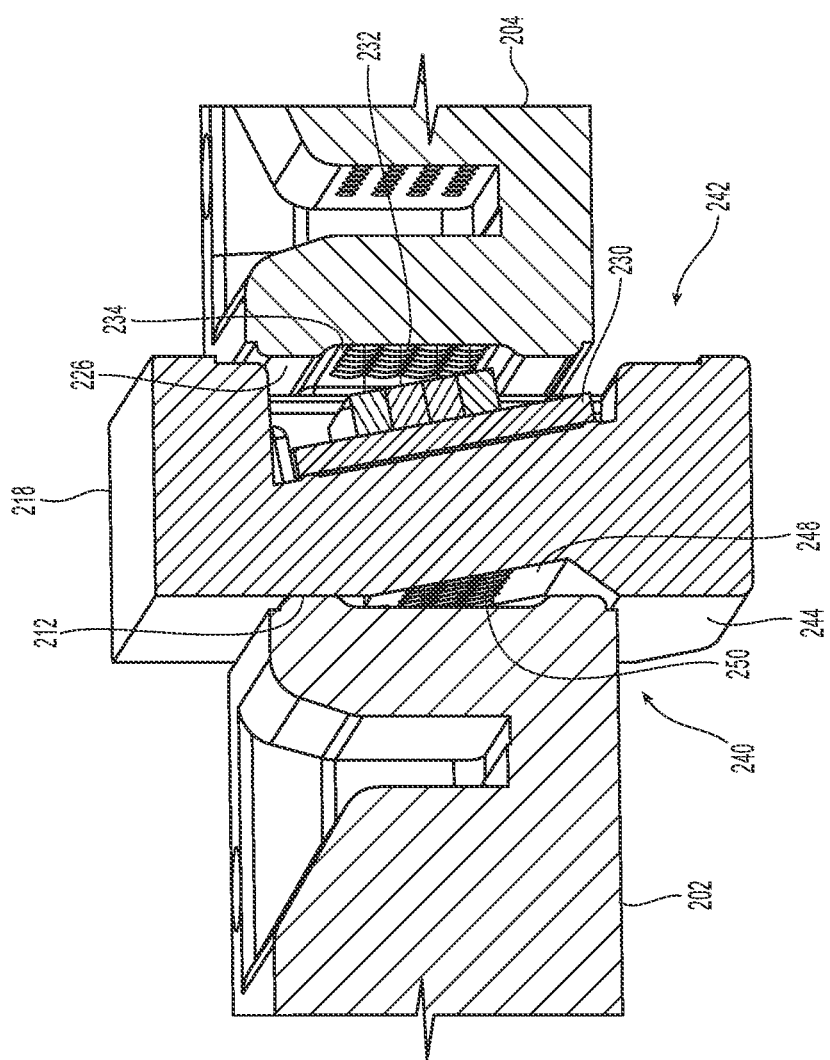
FIG. 9 is an enlarged cross section view of a portion of the assembly of two fiber optic ferrules in FIG. 8.
Figure 11:
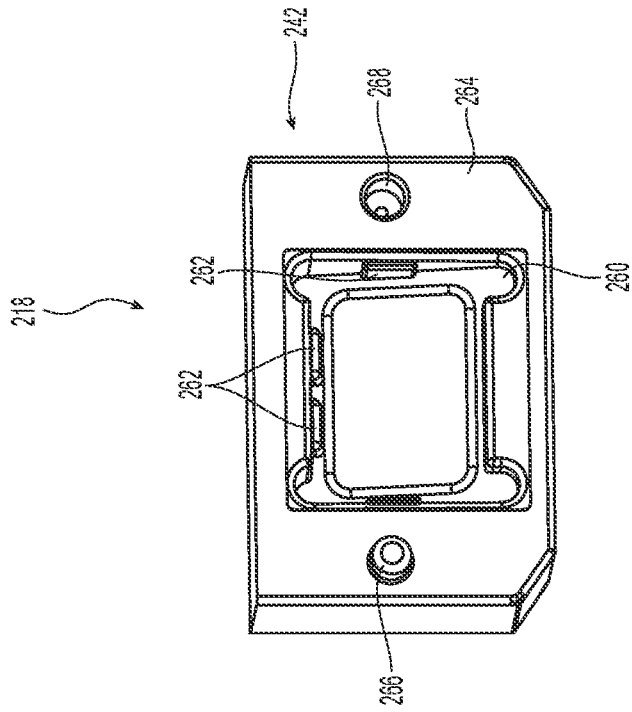
FIG. 11 is an enlarged, perspective view of the other side of the interface plate in FIG. 7.
Figure 10:
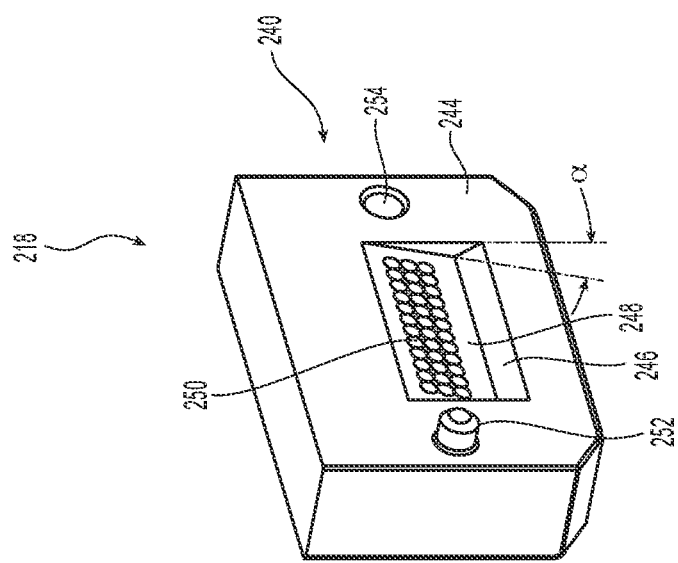
FIG. 10 is an enlarged, perspective view of one side of the interface plate in FIG. 7.
Figure 12:
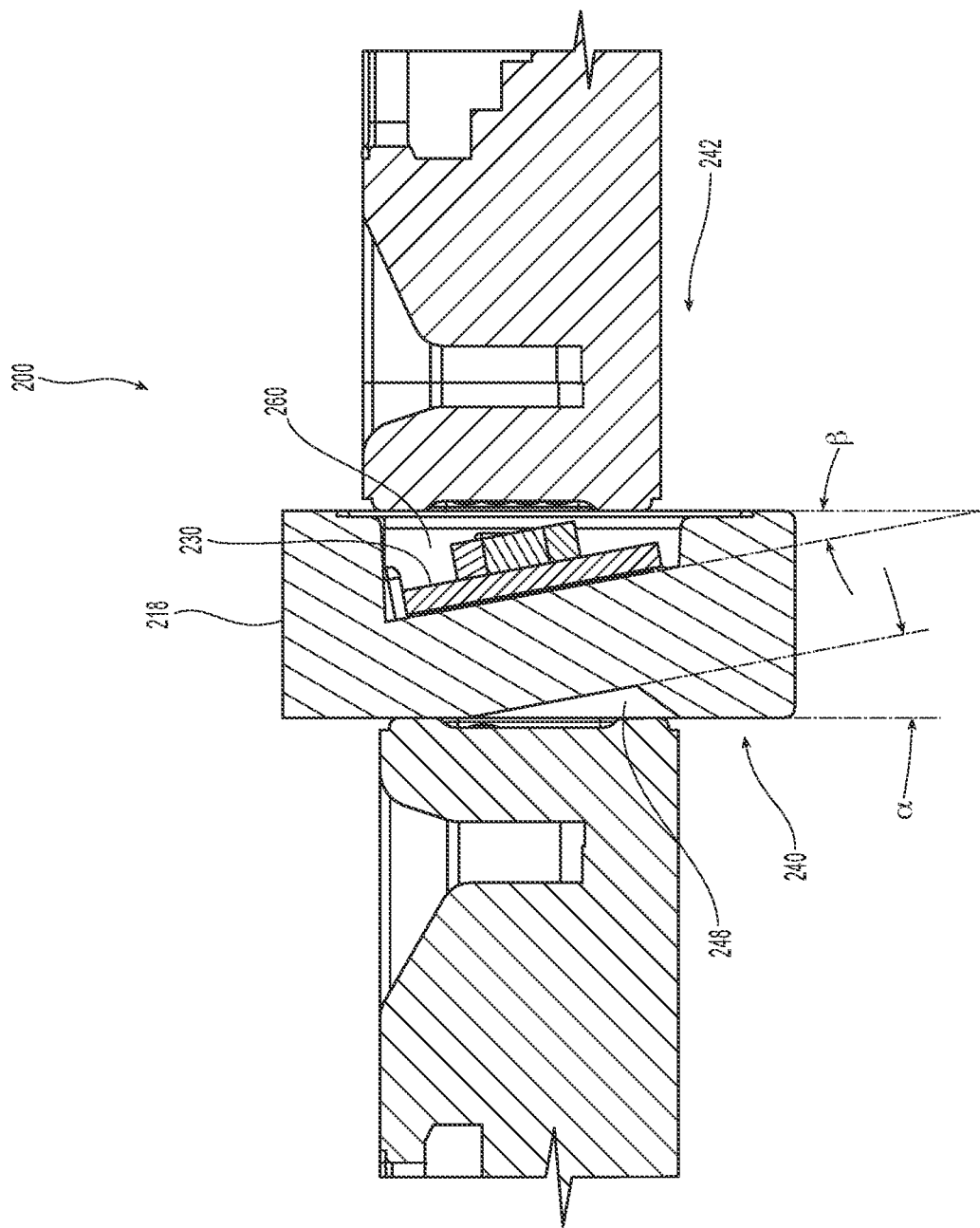
FIG. 12 is an enlarged view of a cross section of the assembly of two fiber optic ferrules in FIG. 7.

The second fiber optic ferrule 204 is a non-CWDM fiber optic ferrule in that the optical fibers carry optical beams that are of only one wavelength, rather than the multiple wavelengths carried in the optical fibers in the first fiber optic ferrule 202 (CWDM). The second fiber optic ferrule 204 also extends between a front end 220 and a rear end 222, and at the front end it has a recessed portion 224. The front end 220 also has a front face 226, which surrounds the recessed portion 224, but the front face 226 need not completely surround the recessed portion 224. The front faces 212,226 make contact with the interface plate 218 as illustrated in FIGS. 7, 9, and 12 and as discussed below. Within that recessed portion 224 are a number of rows of integrated lenses 232 on a forward facing surface 234 to help with the transmission to and from the optical fibers within the second fiber optic ferrule 204. The forward facing surface 234 is perpendicular to the optical beam passing in and out of the second fiber optic ferrule 204. In the example illustrated in FIGS. 8 and 9, there are four rows of integrated lenses 232, which correspond to the number of wavelengths in in the optical beam carried by the optical fibers in the first fiber optic ferrule 202 (CWDM).

Each of the fiber optic ferrules 202, 204 have alignment features that allow for the ferrules to be in alignment when they are mated to one another either through the interface plate 218 or directly with one another. Each of the fiber optic ferrules 202, 204 are hermaphroditic as each has one projection and one opening to receive a projection. With reference to FIG. 8, the first fiber optic ferrule 202 has a projection 236 on one side and an opening 238 on the other. The same is true with the second fiber optic ferrule 204 in that it also has a projection 236' on one side and an opening 238' on the other side.

In this embodiment, the separation of the individual wavelengths of the optical beam are performed by the interface plate 218. The interface plate 218 has the filter block 240 and the reflectors that were integral with the first and second fiber optic ferrules in the first embodiment.

The interface plate 218 has a first side 240 and a second side 242, the second side 242 facing in the opposite direction from the first side 240. The first side 240 is to face and engage the first fiber optic ferrule 202, while the second side 242 is to face and engage the second fiber optic ferrule 204. The first side 240 has a flat front surface 244 that engages at least a portion of the front face 212 of the first fiber optic ferrule 202. The first side 240 also has a recessed portion 246 that has an angled inside surface 248. The angled inside surface has an angle of a relative to the flat front surface 244. See FIG. 10. The inside surface 248 is preferably made from an optically transparent material and also has a plurality of rows and columns of integrated reflectors 240. Thus, the angled inside surface 248 allows the optical beams to pass through it when they do not encounter the reflectors. The first side 240 also has alignment structures 252,254 that allow for the first fiber optic ferrule 202 to be aligned with the integrated reflectors 240 and the angled inside surface 248. In particular, structure 242 is a projection that is to be aligned with an opening in the first fiber optic ferrule 202 and structure 244 is an opening to receive a projection from the first fiber optic ferrule 202.

The interface plate 218 has a second side 242 that holds the filter block 130 and faces the second fiber optic ferrule 204. The second side 242 has a recessed portion 260 and fitting bumps 262 to engage the filter block 230. The second side 242 also has a flat front surface 264 to engage the front face 226 of the second fiber optic ferrule 204 and alignment structures 266,268, which are a projection and an opening. The recessed portion makes an angle β with the flat front face 264. See FIGS. 12 and 13. The angles α and β are chosen such that the individual optical beams outputted from the filter block 230 to the integrated lenses 232 of the second fiber optic ferrule 204 enter the integrated lenses 232 substantially perpendicularly to the front face 226 of the second fiber optic ferrule 204. In one aspect, α equals β, but they could be different.

Figure 14:
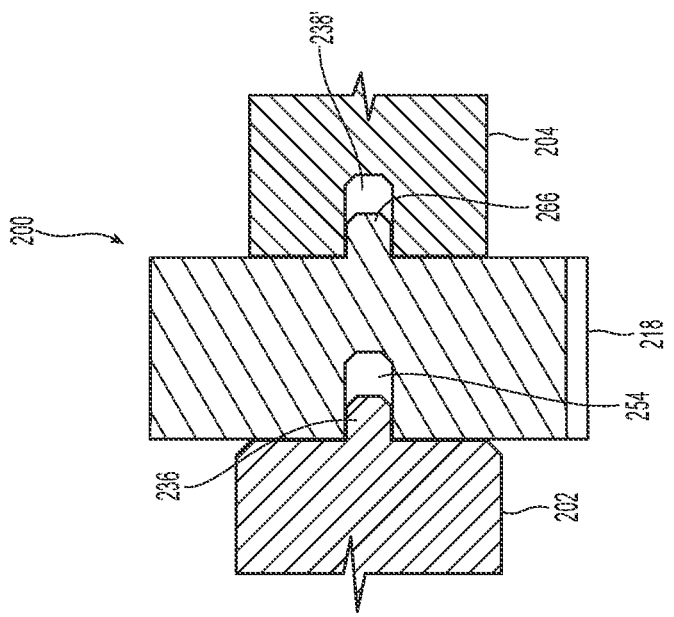
FIG. 14 is an enlarged perspective view of the alignment features of the two fiber optic ferrules and the interface plate.
Figure 13:
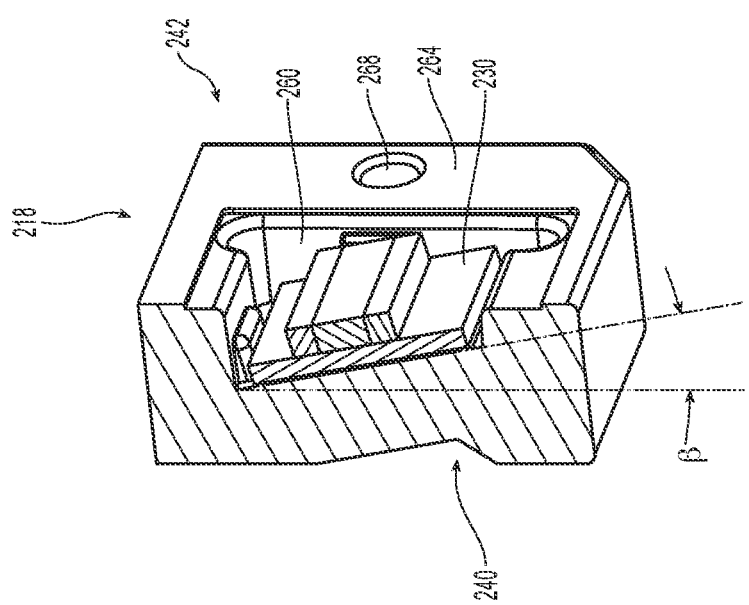
FIG. 13 is an enlarged, perspective view of the front face of the second fiber optic ferrule in FIG. 7.

FIG. 14 illustrates how the three components of the assembly 200 are aligned with one another. On one side of the assembly, the projection 236 of the first fiber optic ferrule 202 engages the opening 254 of the interface plate 218 and the projection 266 of the interface plate 218 engages the opening 238' of the second fiber optic ferrule 204.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An assembly of two fiber optic ferrules comprising:
   a first CWDM fiber optic ferrule having at least one optical fiber with at least two optical beams with different wavelengths therein, wherein the at least two optical beams are wavelength division multiplexed inside the same at least one optical fiber; and
   a second non-CWDM fiber optic ferrule having a first optical fiber to carry one of the optical beams demultiplexed at a first wavelength and a second optical fiber to carry the second optical beam demultiplexed at a second wavelength different from the first wavelength, wherein the second non-CWDM fiber optic ferrule has a front face to engage at least a portion of the first fiber optic ferrule and a plurality of external lenses, the plurality of external lenses being disposed behind the front face.

2. The assembly according to claim 1, further comprising a filter block attached thereto.

3. The assembly according to claim 1, wherein the first fiber optic ferrule has a plurality of reflectors on a forward facing surface.

4. The assembly according to claim 1, wherein the plurality of external lenses are disposed in rows, each row of the plurality of external lenses are spaced at a pitch of 0.250 mm.

5. The assembly according to claim 1, wherein each of the plurality of external lenses is associated with an optical fiber supporting structure within the second fiber optic ferrule.

6. The assembly according to claim 3, wherein the first fiber optic ferrule has a recessed portion at a front end, the plurality of reflectors disposed within the recessed portion.

7. The assembly according to claim 3, further comprising a plurality of transmissive lenses disposed within the recessed portion of the first fiber optic ferrule.

8. The assembly according to claim 1, wherein the second fiber optic ferrule has a recessed portion at a front end, the plurality of external lenses disposed within the recessed portion and two forward facing surfaces to engage a filter block.

9. The assembly according to claim 1, wherein in the second fiber optic ferrule the optical fibers and external lenses are arranged in rows and columns, the optical fibers in each column transporting optical beams with different wavelengths.

10. The assembly according to claim 8, wherein the recessed portion can receive at least a portion of a filter block without touching any of the plurality of external lenses.

11. The assembly according to claim 8, wherein optical fibers enter the first fiber optic ferrule along a first longitudinal axis and optical fibers enter the second fiber optic ferrules along a second longitudinal axis, the first longitudinal axis and the second longitudinal axis being parallel.

12. An assembly of two fiber optic ferrules comprising:
   a first CWDM fiber optic ferrule having at least one optical fiber with at least two optical beams with different wavelengths therein, wherein the at least two optical beams are wavelength division multiplexed inside the same at least one optical fiber; and
   a second non-CWDM fiber optic ferrule having a first optical fiber to carry one of the optical beams demultiplexed at a first wavelength and a second optical fiber to carry the second optical beam demultiplexed at a second wavelength different from the first wavelength, wherein the second non-CWDM fiber optic ferrule has a front face to engage at least a portion of the first fiber optic ferrule and a plurality of external lenses, the plurality of external lenses being disposed behind the front face; and
   an interface plate disposed between and engaged to each of the first CWDM fiber optic ferrule and second non-CWDM fiber optic ferrule.

* * * * *